United States Patent
Katou et al.

(10) Patent No.: US 12,381,216 B2
(45) Date of Patent: Aug. 5, 2025

(54) LITHIUM-CONTAINING COMPLEX OXIDE PRODUCTION METHOD

(71) Applicant: Panasonic Intellectual Property Management Co., Ltd., Osaka (JP)

(72) Inventors: Daisuke Katou, Kyoto (JP); Tomoo Takayama, Osaka (JP); Takuya Jin, Osaka (JP); Mitsuru Iwai, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 610 days.

(21) Appl. No.: 17/417,231

(22) PCT Filed: Dec. 6, 2019

(86) PCT No.: PCT/JP2019/047760
§ 371 (c)(1),
(2) Date: Jun. 22, 2021

(87) PCT Pub. No.: WO2020/137440
PCT Pub. Date: Jul. 2, 2020

(65) Prior Publication Data
US 2022/0059835 A1    Feb. 24, 2022

(30) Foreign Application Priority Data

Dec. 28, 2018    (JP) .................................. 2018-246726

(51) Int. Cl.
*H01M 4/525* (2010.01)
*B28B 11/24* (2006.01)
(Continued)

(52) U.S. Cl.
CPC ........... *H01M 4/525* (2013.01); *B28B 11/243* (2013.01); *C01G 53/42* (2013.01);
(Continued)

(58) Field of Classification Search
CPC ..... B28B 11/243; H01M 4/525; H01M 4/505; H01M 10/0525; C01G 53/42; C01P 2002/50; C01P 2006/40
See application file for complete search history.

(56) References Cited

U.S. PATENT DOCUMENTS 6,077,496 A     6/2000  Ito et al.
6,337,132 B1 *  1/2002  Kajiyama .............. C01G 53/42
                                              427/220
(Continued)

FOREIGN PATENT DOCUMENTS

EP    2677577 A1    12/2013
EP    3909915 A1    11/2021
(Continued)

OTHER PUBLICATIONS

English Translation of International Search Report dated Feb. 4, 2020, issued in counterpart Application No. PCT/JP2019/047760. (2 pages).
(Continued)

*Primary Examiner* — Jerzi H Moreno Hernandez
(74) *Attorney, Agent, or Firm* — WHDA, LLP

(57) ABSTRACT

A method for producing a lithium-containing composite oxide, the method including: a first step of preparing a lithium hydroxide; a second step of heating a hydroxide containing nickel and a metal M1 other than lithium and nickel to 300° C. or higher and 800° C. or lower, to obtain a composite oxide containing the nickel and the metal M; a third step of mixing the lithium hydroxide and the composite oxide, to obtain a mixture; a fourth step of compression-molding the mixture, to obtain a molded body; and a fifth step of baking the molded body at 600° C. or higher and 850° C. or lower, to obtain a baked body.

9 Claims, 1 Drawing Sheet

(51) Int. Cl.
*C01G 53/42* (2025.01)
*H01M 10/0525* (2010.01)

(52) U.S. Cl.
CPC ..... *H01M 10/0525* (2013.01); *C01P 2002/50* (2013.01); *C01P 2006/40* (2013.01)

(56) References Cited

U.S. PATENT DOCUMENTS

| | | | |
|---|---|---|---|
| 2006/0121350 A1* | 6/2006 | Kajiya | H01M 4/525 |
| | | | 429/223 |
| 2013/0224607 A1* | 8/2013 | Ihara | H01M 10/0525 |
| | | | 429/338 |
| 2015/0188136 A1 | 7/2015 | Mori et al. | |
| 2022/0109139 A1* | 4/2022 | Suzuki | H01M 4/0433 |

FOREIGN PATENT DOCUMENTS

| | | | |
|---|---|---|---|
| JP | H11343120 | A * | 12/1992 |
| JP | H11-135118 | A | 5/1999 |
| JP | 2002-020124 | A | 1/2002 |
| JP | 2015-218098 | A | 12/2015 |
| JP | 2018-090485 | A | 6/2018 |
| JP | 2018-193296 | A | 12/2018 |
| JP | 2019-172510 | A | 10/2019 |
| JP | 2019-175695 | A | 10/2019 |
| WO | 2014/010448 | A1 | 1/2014 |

OTHER PUBLICATIONS

Extended (Supplementary) European Search Report dated Feb. 1, 2022, issued in counterpart EP application No. 19902289.8. (8 pages).

* cited by examiner

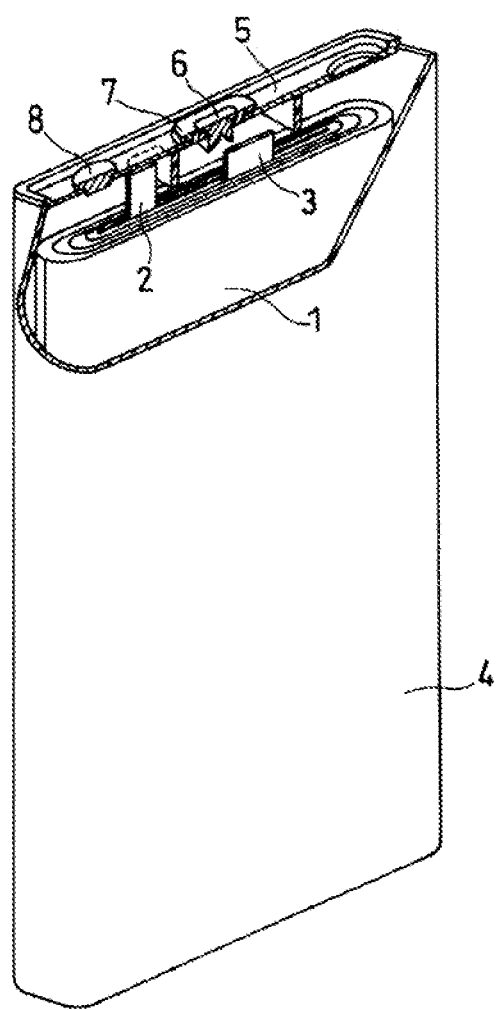

LITHIUM-CONTAINING COMPLEX OXIDE PRODUCTION METHOD

TECHNICAL FIELD

The present disclosure relates to a method for producing a lithium-containing composite oxide.

BACKGROUND ART

A secondary battery represented by a lithium ion secondary battery includes a positive electrode, a negative electrode, and an electrolyte. The positive electrode includes a lithium-containing composite oxide serving as a positive electrode active material. As the lithium-containing composite oxide, for example, lithium nickelate is used which is advantageous in achieving a higher capacity, and with an aim of further improving the battery characteristics, studies have been made to replace part of the nickel with a different kind of metal.

Patent Literature 1, relating to a method for producing a lithium-containing composite oxide, discloses molding a mixture of a lithium compound and a hydroxide containing one or more other metals, such as nickel and cobalt, and packing the resultant molded body into a reaction vessel, followed by baking while an oxidizing gas is forced to pass therethrough.

CITATION LIST

Patent Literature

[PTL 1] Japanese Laid-Open Patent Publication No. H11-135118

SUMMARY OF INVENTION

Technical Problem

However, according to the production method as disclosed in Patent Literature 1, a large amount of water may be produced during baking from the molded body including a hydroxide containing nickel and the like, which may cause the molded body to collapse. When the molded body collapses, less dense portions increase, which may result in an insufficient particle-to-particle contact in the molded body, leading to a reduced heat conductivity of the molded body and thus to a reduced crystallinity of the baked body. Furthermore, when the molded body collapses, the difference between the less dense portions and the dense portions (i.e., the variation in the degree of particle-to-particle contact in the molded body) increases, and the variation in the degree of baking increases, which may cause the baked body to be non-homogeneous.

Solution to Problem

In view of the above, one aspect of the present disclosure relates to a method for producing a lithium-containing composite oxide, the method including: a first step of preparing a lithium hydroxide; a second step of heating a hydroxide containing nickel and a metal M1 other than lithium and nickel to 300° C. or higher and 800° C. or lower, to obtain a composite oxide containing the nickel and the metal M1; a third step of mixing the lithium hydroxide and the composite oxide, to obtain a mixture; a fourth step of compression-molding the mixture, to obtain a molded body, and a fifth step of baking the molded body at 600° C. or higher and 850° C. or lower, to obtain a baked body.

Advantageous Effects of Invention

According to the present disclosure, a homogeneous lithium-containing composite oxide having high crystallinity can be provided.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF DRAWING

FIG. 1 A partially cut-away schematic oblique view of a secondary battery including, as a positive electrode active material, a lithium-containing composite oxide obtained by the production method according to an embodiment of the present disclosure.

DESCRIPTION OF EMBODIMENTS

A method for producing a lithium-containing composite oxide according to the present disclosure includes: a first step of preparing a lithium hydroxide; a second step of heating a hydroxide (hereinafter, sometimes referred to as a hydroxide A) containing nickel and a metal M1 other than lithium and nickel to 300° C. or higher and 800° C. or lower, to obtain a composite oxide (hereinafter, sometimes referred to as a composite oxide B) containing the nickel and the metal M1; a third step of mixing the lithium hydroxide and the aforementioned composite oxide, to obtain a mixture; a fourth step of compression-molding the mixture, to obtain a molded body; and a fifth step of baking the molded body at 600° C. or higher and 850° C. or lower, to obtain a baked body (lithium-containing composite oxide).

By using the composite oxide B obtained by subjecting the hydroxide A to a heat treatment, as a material of the molded body, the generation of water during baking from the molded body can be suppressed, and the collapse of the molded body can be suppressed. Moreover, the decrease in the degree of contact between the lithium hydroxide and the composite oxide B, as well as the decrease in the heat conductivity of the molded body, due to the collapse of the molded body can be suppressed. This can improve the reactivity between the lithium hydroxide and the composite oxide B, which can improve the crystallinity of the baked body (lithium-containing composite oxide). In short, a lithium-containing composite oxide having a large crystallite size can be obtained. Furthermore, the increase in the variation in the degree of baking can be suppressed by the suppression of the collapse of the molded body, and thus, a homogeneous baked body (lithium-containing composite oxide) with small variation in the crystallite size can be provided.

According to the production method above, the crystallite size of the lithium-containing composite oxide can be considerably increased to, for example, about 160 nm. Although the detailed reason is unclear, a favorable contact between the lithium hydroxide and the composite oxide B is considered to have been maintained due to less production of water during baking, which is combined with the excellent heat conductivity of the molded body including these two compounds, resulting in specific improvement in the reactivity between the two compounds.

The crystallite size of the lithium-containing composite oxide can be determined by the following method.

First, the lithium-containing composite oxide is subjected to X-ray diffractometry (XRD), to give an X-ray diffraction pattern thereof. Next, with respect to the obtained X-ray diffraction pattern, pattern fitting is performed by WPPF (whole-powder-pattern fitting) using all the diffraction peaks present between $2\theta=10°$ to $120°$. On the basis of the result, the crystallite size is calculated.

By using the composite oxide B, the atomic ratio of the nickel to the metal M1 (e.g., Co, Al) can be easily controlled, and a homogeneous mixture tends to be obtained in the third step. Furthermore, the variation in the nickel-to-M1 atomic ratio among a plurality of the molded bodies can reduced, and a lithium-containing composite oxide having a target composition can be produced stably.

(First Step)

In the first step, usually, a powder of lithium hydroxide is prepared. The average particle diameter (D50) of the lithium hydroxide is, for example, 10 µm or more and 500 µm or less. The lithium hydroxide is highly reactive with the composite oxide B. and is advantageous in improving the crystallinity of the lithium-containing composite oxide.

The first step preferably includes a step (i) of heating the lithium hydroxide to dry. In the case of performing the step (i), the lithium hydroxide before dry may include a lithium hydroxide monohydrate. Through the step (i), the lithium hydroxide, which is sufficiently dry, can be prepared. This can further suppress the release of water from the molded body during baking, which can further suppress the collapse of the molded body.

The heating temperature of the lithium hydroxide is preferably 100° C. or higher and equal to or lower than a melting point thereof. When the heating temperature is 100° C. or higher, the water contained in the lithium hydroxide can be efficiently removed. When the heating temperature is equal to or lower than the melting point, the particle form of the lithium hydroxide can be maintained, and the workability improves, making it easy to obtain a homogeneous mixture in the third step. The heating time of the lithium hydroxide is, for example, 1 hour or longer and 10 hours or shorter. The heating of the step (i) may be performed in air, but is preferably performed in a non-oxidizing atmosphere containing nitrogen, argon or the like.

(Second Step)

In the second step, the hydroxide A is heated to 300° C. or higher and 800° C. or lower, to give a composite oxide B. The composite oxide B includes that in a state where the Ni site in the crystal lattice of a nickel oxide is partially replaced with the metal M1, or that in a state where the metal M1 is dissolved in solid in a nickel oxide. When the heating temperature of the hydroxide A is in the range as above, the composite oxide B can be efficiently obtained. The heating time of the hydroxide A is, for example, 30 minutes or longer and 10 hours or shorter. The heating of the second step may be performed in a non-oxidizing atmosphere containing nitrogen or the like, and may be performed in an oxidizing atmosphere containing oxygen or the like. The oxidizing atmosphere may be air, and may be an atmosphere having a higher oxygen partial pressure. The oxygen concentration in the oxidizing atmosphere is, for example, 20% or more.

The hydroxide A preferably includes a composite hydroxide containing nickel and the metal M1. In this case, the atomic ratio of the nickel to the metal M1 in the composite oxide B can be easily controlled, and a homogeneous mixture can be easily obtained in the third step. This makes it easy to uniformly disperse nickel and the metal M1 in the molded body, and thus to produce a lithium-containing composite oxide having a target composition.

The composite hydroxide can be produced by any known technique, such as a coprecipitation technique. In the coprecipitation technique, an alkali is added to an aqueous solution containing a nickel salt and a salt of the metal M1, so that a composite hydroxide is coprecipitated. The nickel salt may be, for example, nickel sulfate. When the metal M1 contains cobalt and aluminum, the salt of the metal M1 may be, for example, cobalt sulfate, aluminum sulfate, and the like. The alkali may be, for example, sodium hydroxide.

The hydroxide A may include a nickel hydroxide and a hydroxide of the metal M1. Specifically, a nickel hydroxide and a hydroxide of the metal M1 may be prepared separately, and then mixed together to give a mixture, to which heat treatment may be applied, to form a composite oxide B.

Nickel is advantageous in achieving a higher capacity and reducing the cost. The metal M1 preferably includes cobalt and a metal M2 other than cobalt. Cobalt is advantageous in extending the service life of the battery and other points. The metal M2 preferably includes at least aluminum. Aluminum is advantageous in improving the thermal stability and other points. By using a lithium-containing composite oxide containing nickel, cobalt, and aluminum, as a positive electrode active material, a higher capacity and a longer service life of the secondary battery can be achieved.

In view of stabilizing the crystal structure and other points, the metal M2 may further include at least one selected from the group consisting of manganese, tungsten, niobium, magnesium, zirconium, and zinc.

The hydroxide A may include a nickel hydroxide, a cobalt hydroxide, and a hydroxide of the metal M2. Also, the hydroxide A may include a composite hydroxide containing two or more selected from the group consisting of nickel, cobalt, and the metal M2, and preferably includes a composite hydroxide containing nickel, cobalt, and the metal M2. When a composite hydroxide is used, nickel, cobalt, and the metal M2 can be easily uniformly dispersed in the molded body.

When the atomic ratio of nickel, cobalt and the metal M2 contained in the hydroxide A is Ni:Co:M2=(1−x−y):x:y, x preferably satisfies $0.01<x<0.15$, and y preferably satisfies $0.001<y<0.1$. In this case, the effects produced by using nickel, cobalt, the metal M2 can be obtained in a balanced manner.

In the second step, particles of the composite oxide B are preferably obtained by subjecting the particles of the composite hydroxide to heat treatment. In this case, a homogeneous mixture can be efficiently obtained in the third step. The composite hydroxide obtained by a coprecipitation technique can form secondary particles formed of aggregated primary particles. The secondary particles of the composite hydroxide have an average particle diameter (D50) of, for example, 2 µm or more and 20 µm or less. The average particle diameter (D50) of the secondary particles can be determined through particle size distribution measurement by laser diffractometry: The average particle diameter (D50) is a median diameter at 50% cumulative volume in a volumetric particle size distribution.

The particle size of the composite oxide B may be adjusted by crushing and/or classifying at least one of the composite hydroxide and the composite oxide B, and may be adjusted by changing the conditions for preparing a composite hydroxide by a coprecipitation technique or the conditions for heat treatment of the second step.

(Third Step)

In the third step, the lithium hydroxide and the composite oxide B obtained in the second step are mixed together, to form a mixture. In view of suppressing the collapse of the molded body, the mixing of the third step is performed by a dry process. In other words, in the third step, the mixing of the lithium hydroxide and the composite oxide B is performed without adding a dispersion medium, such as water.

(Fourth Step)

In the fourth step, the mixture obtained in the third step is compression-molded, to give a molded body. In view of suppressing the collapse of the molded body, the compression molding of the fourth step is performed by a dry process. In other words, in the fourth step, the compression molding of the mixture is performed without adding a dispersion medium, such as water.

The molded body may be formed in any shape, but, in view of efficient and uniform application of heat thereto, is formed in, for example, a spherical shape, a spheroidal shape, a columnar shape, an elliptic columnar shape, a prismatic shape, or a disc shape. The maximum diameter of the molded body is, for example, 1 mm or more and 50 mm or less.

For the compression-molding, a compression-molding machine, such as a granulating machine, a pelleting machine, and a tableting machine, may be used.

In the fourth step, the mixture is preferably compression-molded until the molded body has a density of 1.5 g/cm$^3$ or more and 2.2 g/cm$^3$ or less. When the density of the molded body is 1.5 g/cm$^3$ or more, the particles can be brought into sufficient contact (close contact) with each other, and the reaction between the particles tends to proceed smoothly, and also, the molded body is unlikely to collapse during baking. When the density of the molded body is 2.2 g/cm$^3$ or less, voids are formed in moderation within the molded body, and an oxidizing gas, such as oxygen, can be supplied also into the inside of the molded body, which can sufficiently reduce the variation in the degree of baking between the surface and the inside of the molded body.

(Fifth Step)

In the fifth step, the molded body obtained in the fourth step is baked at 600° C. or higher and 850° C. or lower, to obtain a baked body (lithium-containing composite oxide). The baking time in the fifth step is, for example, 2 hours or longer and 30 hours or shorter. The baking is usually performed in an oxidizing atmosphere containing oxygen or the like. The oxidizing atmosphere may be air, and may be an atmosphere having a higher oxygen partial pressure. The oxygen concentration in the oxidizing atmosphere is, for example, 20% or more.

By using the above molded body, the reactivity between the lithium hydroxide and the composite oxide B during baking can be improved, and a lithium-containing composite oxide with small lithium deficiency can be stably obtained. When the baking temperature and the baking time are within the ranges as above, the whole molded body can be efficiently and sufficiently baked.

In view of forming a homogeneous baked body, it is preferable to perform the baking while supplying an oxidizing gas containing oxygen or the like to the molded body. Specifically, it is preferably to contain a plurality of the molded bodies in a predetermined reaction vessel, and bake the molded bodies while supplying an oxidizing gas into the reaction vessel. Even in the case of packing a large quantity of the molded bodies in the reaction vessel, sufficient space is formed within the piled-up molded bodies (between the molded bodies), which allows the oxidizing gas to spread throughout the piled-up molded bodies. Therefore, the whole piled-up molded bodies can be uniformly baked, and homogenous baked bodies can be produced in a large quantity.

In the case of baking the mixture (powder) without subjecting it to compression-molding, the powder may be scattered as the oxidizing gas is supplied, or a molten material accumulated at the bottom of the reaction vessel during baking may prevent uniform baking. On the other hand, in the case of baking the molded body, the above inconvenience can be avoided. The shape of the molded body can be retained during baking, and a baked body having almost the same shape as that of the molded body can be obtained.

In the fifth step, a layered rock-salt type lithium-containing composite oxide in which nickel in the lithium nickelate is partially replaced with the metal M1 (cobalt and metal M2) can be obtained. By partially replacing nickel with the metal M1, the battery performance can be further improved. The lithium-containing composite oxide obtained in the fifth step preferably has a composition represented by a formula: $Li_a Ni_{1-x-y} Co_x M2_y O_2$. In the formula, a satisfies 0.9<a<1.1, x satisfies 0.01<x<0.15, and y satisfies 0.001<y<0.1. By using a lithium-containing composite oxide having the above composition as the positive electrode active material, a high-capacity and long-life secondary battery can be provided.

In the case of producing a lithium-containing composite oxide having the above composition, it is preferable to use $Ni_{1-x-y} Co_x M2_y (OH)_2$ as the hydroxide A (composite hydroxide) in the second step. In the third step, the lithium hydroxide and the composite oxide B are mixed such that the atomic ratio: Li/(Ni+M1) of the lithium in the lithium hydroxide to the total of the nickel and the metal M1 in the composite oxide B exceeds 0.9 but is less than 1.1.

In addition, at least one of a step of crushing the baked body and a step of classifying the baked body may be included. For crushing, a ball mill, a mortar, and the like are used. For classifying, a sieve and the like are used. In this case, the particle size of the lithium-containing composite oxide can be adjusted so that favorable negative electrode characteristics can be obtained.

The lithium-containing composite oxide can form secondary particle formed of aggregated primary particles. The secondary particles of the lithium-containing composite oxide have an average particle diameter (D50) of, for example, 2 μm or more and 20 μm or less.

The lithium-containing composite oxide obtained by the above-described production method is preferably used as a positive electrode active material of a secondary battery. A description will be given below of the secondary battery.

The secondary battery includes a positive electrode including a positive electrode active material capable of electrochemically absorbing and releasing lithium ions, a negative electrode including a negative electrode active material capable of electrochemically absorbing and releasing lithium ions, and a non-aqueous electrolyte. The positive electrode active material includes a lithium-containing composite oxide obtained by the above-described production method.

The positive electrode includes, for example, a positive electrode current collector, and a positive electrode material mixture layer formed on a surface of the positive electrode current collector. The positive electrode material mixture layer may be formed on one surface or both surfaces of the positive electrode current collector. The positive electrode material mixture essentially includes a positive electrode active material, and may optionally include a binder, an electrically conductive agent, and the like. The positive electrode current collector may be made of, for example, stainless steel, aluminum, an aluminum alloy, and titanium. Examples of the binder include polytetrafluoroethylene and polyvinylidene fluoride. Examples of the conductive agent include: graphite, such as natural graphite and artificial graphite; and carbon blacks, such as the acetylene black.

The negative electrode includes, for example, a negative electrode current collector, and a negative electrode material mixture layer formed on a surface of the negative electrode current collector. The negative electrode material mixture layer may be formed on one surface or both surfaces of the negative electrode current collector. The negative electrode material mixture essentially includes a negative electrode active material, and may optionally include a binder, a thickener, and the like. Examples of the binder are as those exemplified for the positive electrode. Examples of the thickener include carboxymethyl cellulose (CMC) and modified products thereof (including salts such as Na salts). The negative electrode current collector may be made of, for example, stainless steel, nickel, a nickel alloy, copper, and a copper alloy.

Examples of the negative electrode active material include: a carbon material; silicon; a silicon compound, such as a silicon oxide; and a lithium alloy containing at least one selected from the group consisting of tin, aluminum, zinc, and magnesium. Examples of the carbon material include graphite (e.g., natural graphite, artificial graphite) and amorphous carbon.

The electrolyte may be a liquid electrolyte in which a solute, such as a lithium salt, is dissolved in a solvent. The solvent may be a non-aqueous solvent, and may be water. The electrolyte may be a solid electrolyte.

The electrolyte contains, for example, a non-aqueous solvent and a lithium salt dissolved in the non-aqueous solvent. Examples of the non-aqueous solvent include cyclic carbonic ester, chain carbonic ester, cyclic carboxylic acid ester, and chain carboxylic acid ester. Examples of the lithium salt include $LiPF_6$.

Usually, it is desirable to interpose a separator between the positive electrode and the negative electrode. The separator is excellent in ion permeability and has moderate mechanical strength and electrically insulating properties. The separator may be, for example, a microporous thin film, a woven fabric, or a nonwoven fabric. The separator is preferably made of, for example, a polyolefin, such as polypropylene or polyethylene.

The secondary battery, for example, has a structure in which an electrode group formed by winding the positive electrode and the negative electrode with the separator interposed therebetween is housed in an outer case, together with the electrolyte. The wound-type electrode group may be replaced with a different form of electrode group, for example, a stacked-type electrode group formed by stacking the positive electrode and the negative electrode with the separator interposed therebetween. The secondary battery may be in any form, such as cylindrical type, prismatic type, coin type, button type, or laminate type.

An example of the secondary battery will be described below with reference to FIG. 1. FIG. 1 is a partially cut-away schematic oblique view of a secondary battery including, as the positive electrode active material, a lithium-containing composite oxide obtained by the production method according to an embodiment of the present disclosure.

The battery includes a bottomed prismatic battery case 4, and an electrode group 1 and an electrolyte (not shown) housed in the battery case 4. The electrode group 1 has a long negative electrode, a long positive electrode, and a separator interposed therebetween and preventing the positive and negative electrodes from directly contacting with each other. The electrode group 1 is formed by winding the negative electrode, the positive electrode, and the separator around a flat plate-like winding core, and then removing the winding core.

A negative electrode lead 3 is attached at its one end to the negative electrode current collector of the negative electrode, by means of welding or the like. The negative electrode lead 3 is electrically connected at its other end, via an electrically insulating plate (not shown) made of resin, to a negative electrode terminal 6 disposed at a sealing plate 5. The negative electrode terminal 6 is electrically insulated from the sealing plate 5 by the resin gasket 7. A positive electrode lead 2 is attached at its one end to the positive electrode current collector of the positive electrode, by means of welding or the like. The positive electrode lead 2 is electrically connected at its other end, via the insulating plate, to the back side of the sealing plate 5. In other words, the positive electrode lead 2 is electrically connected to the battery case 4 serving as a positive electrode terminal. The insulating plate separates the electrode group 1 from the sealing plate 5, and separates the negative electrode lead 3 from the battery case 4. The sealing plate 5 is fitted at its periphery to the opening end of the battery case 4, and the fitted portion is laser-welded. In this way, the opening of the battery case 4 is sealed with the sealing plate 5. The electrolyte injection hole provided in the sealing plate 5 is closed with a sealing stopper 8.

EXAMPLES

The present disclosure will be specifically described below with reference to Examples and Comparative Examples. It is to be noted, however, the present invention is not limited to the following Examples.

Example 1

A lithium hydroxide monohydrate (average particle diameter (D50): 50 μm) was heated to dry at 150° C. for one hour, to prepare a lithium hydroxide (the first step). $Ni_{0.85}Co_{0.12}Al_{0.03}(OH)_2$ (average particle diameter (D50) of secondary particles: approx. 15 μm) was obtained as a hydroxide A by a coprecipitation technique. The $Ni_{0.85}Co_{0.12}Al_{0.03}(OH)_2$ was heated at 700° C. in air for 2 hours, so that $Ni_{0.85}Co_{0.12}Al_{0.03}O$ was obtained as a composite oxide B (the second step). The lithium hydroxide and the $Ni_{0.85}Co_{0.12}Al_{0.03}O$ were mixed together such that the atomic ratio: Li/(Ni+Co+Al) of Li to the total of Ni, Co and Al became 1.05/1, to give a mixture (the third step).

The mixture was compression-molded using a tableting machine, to give a columnar molded body (diameter: 6 mm, height: 6 mm) (the fourth step). At this time, the compression force was adjusted such that the density of the molded body became 1.6 g/cm³. The mixing of the third step and the compression molding of the fourth step were each performed by a dry process. The molded body was baked at 750° C. in an oxidizing atmosphere (oxygen concentration: 99%) for 5 hours, to give a baked body (lithium-containing composite oxide) (the fifth step). The lithium-containing composite oxide had a composition represented by $Li_{1.05}Ni_{0.85}Co_{0.12}Al_{0.03}O_2$. The composition of the lithium-containing composite oxide was determined by ICP emission spectrometry.

Comparative Example 1

In the first step, the lithium hydroxide monohydrate was not heated to dry. The second step was skipped. In the third step, the $Ni_{0.85}Co_{0.12}Al_{0.03}(OH)_2$ obtained by a coprecipitation technique was used, in place of the $Ni_{0.85}Co_{0.12}Al_{0.03}O$. A lithium-containing composite oxide was obtained in the same manner as in Example 1, except the above.

Comparative Example 2

The fourth step was skipped. In the fifth step, the mixture (powder) obtained in the third step was used, in place of the molded body. A lithium-containing composite oxide was obtained in the same manner as in Example 1, except the above.

Comparative Example 3

In the first step, the lithium hydroxide monohydrate was not heated to dry. The second step was skipped. In the third step, the $Ni_{0.85}Co_{0.12}Al_{0.03}(OH)_2$ obtained by a coprecipitation technique was used, in place of the $Ni_{0.85}Co_{0.12}Al_{0.03}O$. The fourth step was skipped. In the fifth step, the mixture (powder) obtained in the third step was used, in place of the molded body. A lithium-containing composite oxide was obtained in the same manner as in Example 1, except the above.

The crystallite size of each of the lithium-containing composite oxides obtained in Example 1 and Comparative Examples 1 to 3 were determined by the method as described above. The determined values of the crystallite size are shown in Table 1.

TABLE 1

| | Crystallite size of lithium-containing composite oxide (nm) |
|---|---|
| Ex. 1 | 160 |
| Com. Ex. 1 | 136 |
| Com. Ex. 2 | 132 |
| Com. Ex. 3 | 120 |

In the lithium-containing composite oxide obtained in Example 1, the crystallite size was significantly increased, as compared to in the lithium-containing composite oxides obtained in Comparative Examples 1 to 3. In Example 1, the collapse of the molded body due to the generation of water during baking was suppressed. And the favorable contact between the lithium hydroxide and the composite oxide B and the high thermal conductivity of the molded body containing the both compounds were maintained. As a result, the reactivity between the two compounds was significantly improved, and the crystallinity of the baked body was significantly enhanced.

In Comparative Example 1, water was produced from the molded body during baking, causing the molded body to collapse. And the thermal conductivity of the molded body decreased, and the lithium hydroxide and the composite oxide B failed to sufficiently contact with each other. As a result, the reactivity between the lithium hydroxide and the composite oxide B was degraded, and the crystallinity of the baked body was reduced.

In Comparative Example 2, baking was conducted on the mixture (powder) which was poor in thermal conductivity. And the lithium hydroxide and the composite oxide B were not in sufficient contact with each other. As a result, the reactivity between the lithium hydroxide and the composite oxide B was degraded, and the crystallinity of the baked body was reduced.

In Comparative Example 3, baking was conducted on the mixture (powder) which was poor in thermal conductivity. And the lithium hydroxide and the composite oxide A were not in sufficient contact with each other. As a result, the reactivity between the lithium hydroxide and the composite oxide A was degraded, and the crystallinity of the baked body was reduced.

INDUSTRIAL APPLICABILITY

The lithium-containing composite oxide obtained by the production method according to the present disclosure is suitably used, for example, as a positive electrode active material for a secondary battery required to have a high capacity and high reliability. The secondary battery is preferably used, for example, as a main power source of a portable electronic device and the like, and as a power storage device (e.g., a device for storing natural energy, such as solar power).

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

REFERENCE SIGNS LIST

1: electrode group, 2: positive electrode lead, 3: negative electrode lead, 4: battery case, 5: sealing plate, 6: negative electrode terminal, 7: gasket, 8: sealing stopper

The invention claimed is:

1. A method for producing a lithium-containing composite oxide, the method comprising:
   a first step of preparing a lithium hydroxide;
   a second step of heating a hydroxide containing nickel and a metal M1 other than lithium and nickel to 300° C. or higher and 800° C. or lower, to obtain a composite oxide containing the nickel and the metal M1;
   a third step of mixing the lithium hydroxide and the composite oxide, to obtain a mixture;
   a fourth step of compression-molding the mixture, to obtain a self-supporting molded body that has a density of 1.5 g/cm$^3$ or more and 2.2 g/cm$^3$ or less in an unmolded state thereof; and
   a fifth step of baking the self-supporting molded body at 600° C. or higher and 850° C. or lower, to obtain a baked body, and
   wherein each of the third step and the fourth step is performed by a dry process.

2. The method for producing a lithium-containing composite oxide according to claim 1, wherein
the metal M1 includes cobalt and a metal M2 other than the cobalt, and
the metal M2 includes at least aluminum.

3. The method for producing a lithium-containing composite oxide according to claim 2, wherein the metal M2 further includes at least one selected from the group consisting of manganese, tungsten, niobium, magnesium, zirconium, and zinc.

4. The method for producing a lithium-containing composite oxide according to claim 2, wherein an atomic ratio of the nickel, the cobalt, and the metal M2 contained in the hydroxide is Ni:Co:M2=(1−x−y):x:y, where
the x satisfies $0.01<x<0.15$, and
the y satisfies $0.001<y<0.1$.

5. The method for producing a lithium-containing composite oxide according to claim 2, wherein the first step includes a step of heating the lithium hydroxide to 100° C. or higher and below a melting point of the lithium hydroxide, to dry.

6. The method for producing a lithium-containing composite oxide according to claim 1, wherein in the third step, the lithium hydroxide and the composite oxide are mixed such that an atomic ratio: Li/(Ni+M1) of lithium in the lithium hydroxide to a total of the nickel and the metal M1 in the composite oxide exceeds 0.9 but is less than 1.1.

7. The method for producing a lithium-containing composite oxide according to claim 1, the method further comprising at least one of a step of crushing the baked body and a step of classifying the baked body.

8. The method for producing a lithium-containing composite oxide according to claim 2, wherein the metal M2 further includes at least zirconium.

9. The method for producing a lithium-containing composite oxide according to claim 1,
wherein the lithium-containing composite oxide includes secondary particles with an average particle diameter of 2 μm or more and 20 μm or less.

* * * * *